Oct. 23, 1923.
R. WRIGHT
SEED PAN
Filed Dec. 20, 1920
1,471,581
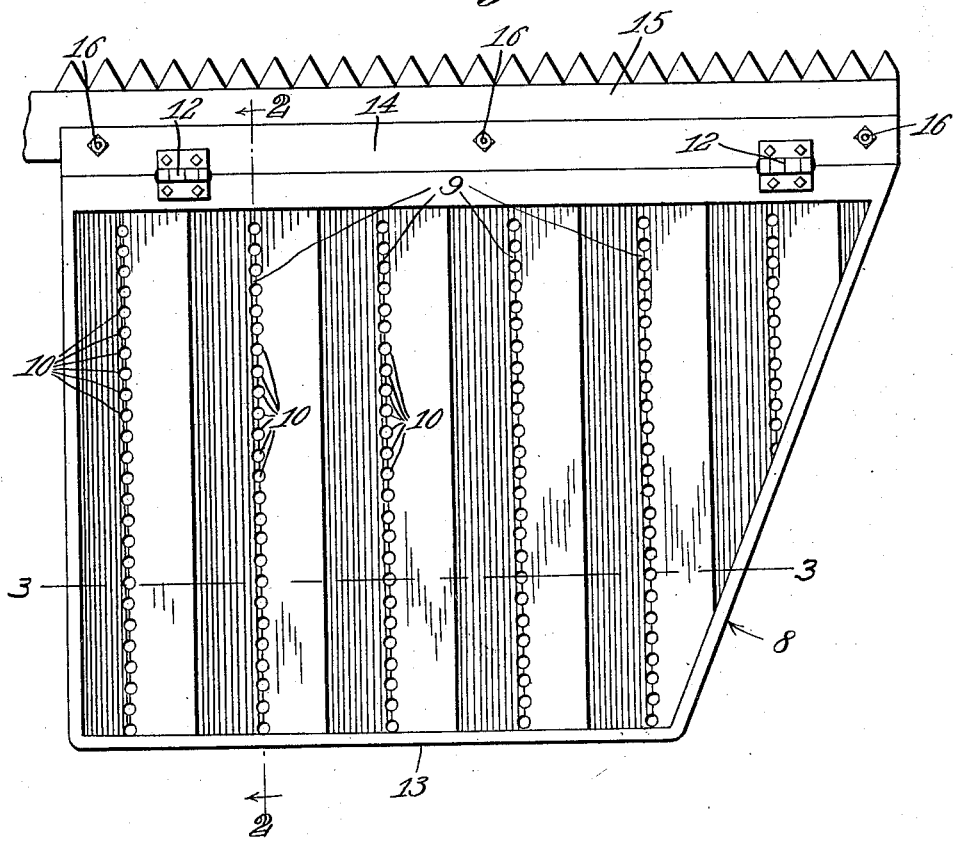
Fig.1.
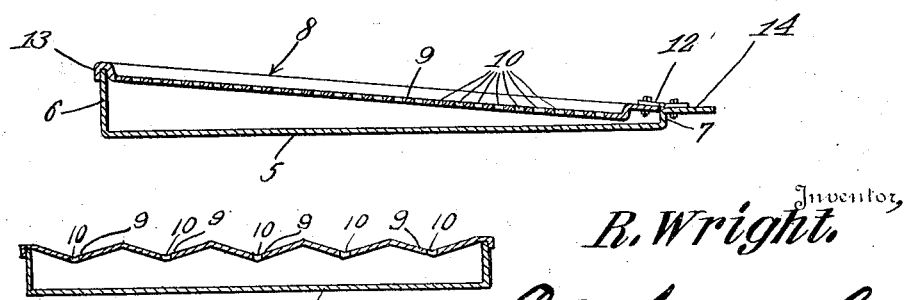
Fig.2.
Fig.3.
Inventor,
R. Wright.
By C. A. Snow & Co.
Attorney Patented Oct. 23, 1923.

1,471,581

UNITED STATES PATENT OFFICE.

RAY WRIGHT, OF JACKSON, MISSISSIPPI.

SEED PAN.

Application filed December 20, 1920. Serial No. 431,993.

*To all whom it may concern:*

Be it known that I, RAY WRIGHT, a citizen of the United States, residing at Jackson, in the county of Hinds and State of Mississippi, have invented a new and useful Seed Pan, of which the following is a specification.

This invention relates to agricultural machines, and more particularly to an attachment designed for use with a mowing machine.

The primary object of the invention is to provide means to be attached to the cutter bar of a mowing machine for catching the seed which ordinarily falls from the plant, during the mowing operation.

A further object of the invention is to provide a receptacle having a novel form of cover, whereby the seed is directed to openings formed therein, where the same fall into the pan.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:—

Figure 1 illustrates a plan view of a seed pan constructed in accordance with the present invention, the same being shown as applied to a cutter bar.

Figure 2 illustrates a sectional view taken on line 2—2 of Figure 1.

Figure 3 illustrates a sectional view taken on line 3—3 of Figure 1.

Referring to the drawing in detail, the reference character 5 designates the pan proper, which is provided with a rear wall 6 and a front wall 7, the rear wall being relatively high with respect to the front wall 7, so that the cover 8, which forms an important feature of the invention will be supported at an angle with respect to the bottom of the pan, so that the grain or seed falling onto the cover 8 will move towards the forward extremity of the pan by gravity.

This cover 8 is provided with a plurality of longitudinal grooves 9, there being provided a plurality of openings 10 formed at the base of each groove, providing communication with the interior of the pan and the grooves, so that seed falling into the grooves will readily pass into the pan.

As shown, this cover 8 is hingedly connected to the pan as at 12, there being provided a downwardly extending flange 13 formed around the cover 8, which flange is adapted to engage behind the walls of the pan proper to secure the cover against movement.

At the forward end of the pan 5 is a flange 14 which extends along the entire length of the pan and provides means for securing the pan 5 to a cutter bar, the cutter bar being indicated by the reference character 15. The bolts 16 pass through suitable openings provided in the flange 14, which openings register with openings in the cutter bar 15 to receive the bolts.

In the operation of the device, the pan is connected to a cutter bar at the rear thereof, so that the hay cut by the mowing machine will fall onto the cover 8 before passing onto the ground surface over which the mower is operated, with the result that the ripe seeds fall into the grooves 9 from where they pass through the openings 10 into the pan proper.

It is obvious that when the pan becomes filled, the cover may be hinged upwardly and the contents thereof removed.

It might be further stated however that due to the construction of the cover 8, the seed is directed to the openings 10, eliminating any possibility of the seed being carried over the pan, with the hay.

Having thus described the invention, what is claimed as new is:—

In a grain pan, a bottom wall, a front wall, end walls and a relatively wide rear wall, a cover for the pan and having hinged connection therewith adjacent to the front wall, said cover being formed with a plurality of parallel grooves providing ridges lying in planes with the edges of the cover, said grooves having spaced openings extending throughout the lengths thereof, said pan adapted to be secured to the cutter bar of a mowing machine, the ridges of the cover extending at right angles to the cutter bar to receive material therefrom.

In testimony that I claim the foregoing as my own, I have hereto affixed my signature in the presence of two witnesses.

RAY WRIGHT.

Witnesses:
E. E. HINDMAN,
J. L. BARTON.